United States Patent
Sugawara et al.

[11] Patent Number: 6,128,155
[45] Date of Patent: Oct. 3, 2000

[54] HIGH DENSITY MAGNETIC RECORDING APPARATUS INCLUDING A HOLOGRAM TYPE MAGNETIC HEAD POSITIONING SYSTEM

[75] Inventors: Naoto Sugawara; Hiroki Ishida, both of Tokyo, Japan

[73] Assignee: Mitsubishi Denki Kabushiki Kaisha, Tokyo, Japan

[21] Appl. No.: 09/110,239

[22] Filed: Jul. 6, 1998

[30] Foreign Application Priority Data

Dec. 16, 1997 [JP] Japan ................................. 9-346115

[51] Int. Cl.[7] .................................................. G11B 5/596
[52] U.S. Cl. ...................... 360/78.11; 360/77.03
[58] Field of Search ............... 360/77.03, 78.04, 360/78.11; 369/112, 44.23

[56] References Cited

U.S. PATENT DOCUMENTS

| | | | |
|---|---|---|---|
| 5,121,371 | 6/1992 | Farnsworth et al. | 369/44.26 |
| 5,311,378 | 5/1994 | Williams et al. | 360/77.03 |
| 5,317,551 | 5/1994 | Shiono | 369/44.23 X |
| 5,534,693 | 7/1996 | Kondo et al. | 250/237 G |
| 5,701,289 | 12/1997 | Nagano | 369/112 |
| 5,999,498 | 12/1999 | Handa et al. | 369/13 |

FOREIGN PATENT DOCUMENTS

60-33348A 2/1985 Japan.
4219640A 4/1991 Japan.

*Primary Examiner*—Andrew L. Sniezek

[57] ABSTRACT

A magnetic recording apparatus including a magnetic head portion 9, a light emitting portion 10$b$ emitting a light beam, a hologram portion 10$a$, a light receiving portion 10$c$, a carriage 12 and a control portion 16 for positioning the magnetic head portion 9 to a predetermined position. The hologram portion 10$a$ is in a plate-like shape and has on one major surface a first gold reflection surface 10$a$3 formed on a first thing film layer 10$a$1 and on the other major surface a second gold reflection surface 10$a$4 formed on a second thin film layer 10$a$2. The hologram portion 10$a$ also includes a light path 10$a$5 that guides the light beam in a zig-zag manner between the first and the second reflection surfaces 10$a$3 and 10$a$4 and optical components 10$a$8, 10$a$9, 10$a$10 for converting the light emitted from the light emitting portion 10$b$ into a positioning light beam.

24 Claims, 7 Drawing Sheets

| THIN FILM MATERIAL (101) | FILM THICKNESS (Å) (102) | INTIMATENESS (103) |
|---|---|---|
| Ti | 5 | 20/50 |
| | 10 | 46/50 |
| | 15 | 49/50 |
| | 20 | 50/50 |
| | 50 | 50/50 |
| | 100 | 50/50 |
| $TiO_2$ | 5 | 17/50 |
| | 10 | 42/50 |
| | 15 | 50/50 |
| | 20 | 50/50 |
| | 50 | 50/50 |
| | 100 | 50/50 |
| Cr | 5 | 38/50 |
| | 10 | 47/50 |
| | 15 | 50/50 |
| | 20 | 50/50 |
| | 50 | 50/50 |
| | 100 | 50/50 |

HIGH DENSITY MAGNETIC RECORDING APPARATUS INCLUDING A HOLOGRAM TYPE MAGNETIC HEAD POSITIONING SYSTEM

BACKGROUND OF THE INVENTION

This invention relates to a magnetic recording apparatus and, more particularly, to the positioning of a magnetic head relative to a disc-shaped magnetic recording medium by projecting a light beam to the recording medium and, for example, a magnetic recording apparatus in which the output power of a positioning light for positioning the magnetic head may be increased.

A typical size of a recording medium attachable and detachable to a magnetic recording apparatus is 3.5 inch type which may have as high a track density as of about 2,100–2,500 TPI (Tracks Per Inch) and its recording capacity is 100–120 megabytes.

In order to enable recording, erasing or reproducing information of such a high recording density, the recording medium has been provided with a position detection track groove, so that a closed loop optical servo utilizing the position detection track groove can position a magnetic head in relation to the recording tracks.

Figure 9:
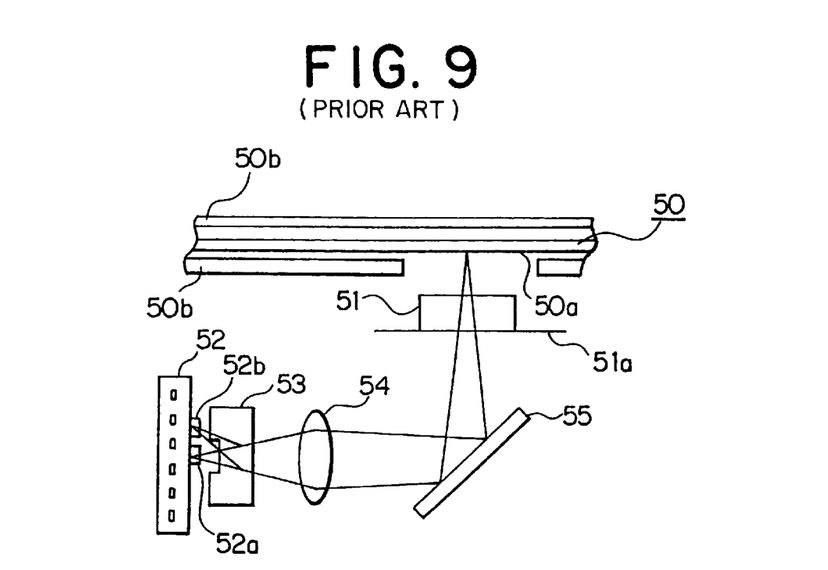
FIG. 9 is a view illustrating a conventional magnetic recording apparatus.

FIG. 9 is an explanatory view indicating the optical system of a conventional magnetic recording apparatus. In the figure, 50 is a disc-shaped recording medium, 50a is a position detection track groove concentrically and continuously formed on one side of the recording medium 50 for a predetermined length, 50b is a cartridge portion for protecting the recording medium 50. 51 is a magnetic head for recording or erasing of information or reproducing the recorded information and is bonded to a support spring 51a to be mounted to the carriage mechanism portion (not shown) so that its magnetic gap portion (not shown) slides on the surface the recording medium 50 on the side to which the position detection track grooves 50a are provided.

Also, 52 is a light emitting and receiving portion, which is provided with a light emitting portion or a laser diode 52a (which will be referred to as LD 52a hereinafter) and a light receiving portion or a photo diode 52b (which will be referred to as PD 52a hereinafter).

Further, 53 is a hologram portion provided with an optical element (not shown) for separating the light from the LD 52a into a plurality of light beams and another optical element (not shown) for introducing the reflected light from the recording medium 50 to the PD 52b.

Also, 54 is a lens for focusing the light beams from the hologram portion 53 and for introducing the reflected light to the hologram portion 53, and 55 is a mirror for introducing the light beams from the lens 54 to the recording medium 50 and for introducing the reflected light beams from the recording medium 50 to the lens 54.

The components 52 to 55 constitute an optical system. This optical system, the magnetic head 51 and the support spring 51a are disposed on the carriage mechanism portion (not shown) so that they are simultaneously movable in the radial direction.

Its operation will now be described. The recording medium 50 is rotated at a constant speed by a medium drive motor (not shown). The magnetic head 51 is supported by the support spring 51a so that its magnetic gap portion slides over the recording medium 50.

The closed loop optical servo control will now be described. The light emitted from the LD 52a is divided mainly into three light beams through the hologram portion 53, and these three light beams are focused by the lens 54 and directed to the mirror 55 as three light beams. The mirror 55 guides these light beams onto the recording medium 50.

When three light beams are to be irradiated to the position detection track groove portion 50a, the position of the light emitting and receiving portion 52 is adjusted during assembly of the apparatus so that the direction of alignment of the three light beams defines a predetermined angle with respect to the position detection track groove portion 50a.

The three light beams directed to the recording medium 50 by the mirror 55 are reflected as the reflected light beams of different intensities according to the irradiated state relative to the recording medium 50 or the position detection track groove portion 50a disposed on the recording medium 50. The three light beams reflected to the mirror 55 are directed to the lens 54 by the mirror, fed to the hologram portion 53 by the lens 54, and applied to the PD 52b through the hologram portion 53.

The PD 52b receives three deflected light beams and provides detection signals in accordance with the intensity of the received light. The servo control portion (not shown) receives the detection signal from the PD 52b and delivers a drive signal for driving the carriage mechanism portion (not shown) in accordance with the content of the detection signal. The closed loop optical servo control continues until the magnetic head (more precisely, the magnetic gap portion) in the carriage mechanism portion is assigned to a predetermined track.

Since the conventional magnetic recording apparatus has the structure as above described, three light beams must be precisely focused on the recording medium 50 (or the position detection track groove 50a). The focus point preciseness of the light requires ±50 μm and this focus adjustment requiring ±50 μm is typically achieved by adjusting the position of the lens 54. However, the hologram portion 53, the lens 54, the mirror 55 and the like are separate components, so that their relative position must be finely adjusted and that the tilt of the lens must also be taken into consideration, resulting in a difficult focus point adjusting operation.

Also, the aligning of the light axis with respect to the position detection track groove portion 50a for a precise signal detection by the light emitting and receiving portion 52 has been very difficult in the past because the light emitting and receiving portion 52, the hologram portion 53, the lens 54 and the mirror 55 are separate components.

Also, since the hologram portion 53, the lens 54, the mirror 55 and the like are separate components, their positional adjustment is difficult and it is difficult to make the optical system small and thin, thereby preventing the magnetic recording apparatus from being made small and thin.

Japanese Patent Laid-Open No. 4-219640 discloses, although not in the field of the magnetic recording apparatus, techniques for integrating an optical system into the hologram portion. However, since these techniques are not the technique in the field of the magnetic recording apparatus, it is difficult to irradiate the light beam onto the position detection track grooves 50a on the recording medium 50 precisely at the proper angles because the surface of the recording medium 50 vibrates due to the sliding movement of the magnetic head 51 thereon, requiring other components such as mirrors, lens and the like, which makes the focus adjusting operation further difficult.

Also, in the apparatus in which the optical system is integrated into the hologram portion, in order to make the light beam travel in a zig-zag manner within the inside of the hologram, opposing surfaces of the hologram made of polyolefin system plastic has formed thereon reflection surfaces of aluminum deposited in a vapor. However, such reflection surfaces of aluminum are not satisfactory for obtaining a positioning light beam and a reflection light beam having a sufficient output intensity. That is, in the magnetic recording apparatus in which the magnetic head 51 slides over the recording medium 50, the reflection factor of the recording medium 50 used is not inherently required to have a high reflection factor, so that the reflection factor is not as high as that of the recording medium (not shown) used with the optical recording apparatus (not shown). In the magnetic recording apparatus, a high output intensity is required for the positioning light and this positioning light of the required output intensity cannot be obtained through the use of an aluminum reflection surface so that the magnetic head 51 cannot be positioned on the desired recording track. Also, due to the relationship of the light reflection or absorption characteristics of aluminum with respect to the light wavelength or output emitted from the light emitting portion, sufficient light output cannot be obtained.

SUMMARY OF THE INVENTION

Accordingly, an object of the present invention is to provide a magnetic recording apparatus free from the above noted problems in conventional magnetic recording apparatus.

Another object of the present invention is to provide a magnetic recording apparatus capable of obtaining sufficient light output for positioning of the magnetic head.

Still another object of the present invention is to provide a magnetic recording apparatus in which the optical system is integrated and which has a small thickness.

A further object of the present invention is to provide a magnetic recording apparatus in which the focus adjustment or the like of an optical system can be eliminated or at least simplified.

With the above objects in view, the magnetic recording apparatus of the present invention comprises a magnetic head portion for recording information on a disc-shaped recording medium and reproducing recorded information from the recording medium, a light emitting portion for emitting light, a hologram portion for converting the light from the light emitting portion into positioning light for positioning the magnetic head and for radiating it onto the recording medium and for receiving the reflected light therefrom, a light receiving portion for receiving the reflected light through the hologram portion and outputting a received light intensity signal, a carriage having the magnetic head portion at one end and arranged to be freely movable in a radial direction, and a control portion for driving the carriage in response to the light-intensity of the received signal from the light receiving portion to position the magnetic head portion at a predetermined position, the hologram portion being in a shape of a plate, the hologram portion being provided on its first major surface with a first thin film layer made of a predetermined metal or a composition thereof and a first reflection surface made of a metal of the element symbol of Au formed on the first thin film layer, the hologram portion having provided on its second major surface with a second thin film layer made of a predetermined metal or a composition thereof and a second reflection surface made of a metal of the element symbol of Au formed on the first thin film layer, and the hologram portion including a light path for transmitting light therethrough in a zigzag manner between the first and second reflection surfaces and a plurality of optical means disposed within the light path for converting the light from the light emitting portion into the positioning light.

The predetermined metal may be titanium and the first and second thin film layers may have film thickness of 10–30 Å, or the first and second thin film layers may preferably have film thickness of 10–20 Å or the first and second thin film layers may most preferably have film thickness of about 10 Å.

the predetermined metal composition may be titanium oxide and the first and second thin film layers may have film thickness of 10–30 Å, or the first and second thin film layers may preferably have film thickness of 10–20 Å or the first and second thin film layers may most preferably have film thickness of about 10 Å.

The predetermined metal may be chromium and the first and second thin film layers may preferably have film thickness of 10–30 Å, or the first and second thin film layers may preferably have film thickness of 10–20 Å or the first and second thin film layers may most preferably have film thickness of about 10 Å.

The hologram portion includes a first optical refraction means for dividing, a second optical refraction means for deflecting the travel path of the light passing through the light path, and an optical focusing means for focusing the light passing through the light path.

The light emitting portion, the hologram portion and the light receiving portion are secured together to define an optical portion assembly supported from the magnetic head portion, the optical portion assembly allowing the positioning light from the hologram portion to be irradiated onto the recording medium through a light passing portion of the magnetic head portion.

The hologram portion includes a first input/output surface disposed at a first predetermined angle with respect to the first reflection surface for introducing the light from the light emitting portion into the first optical refraction means and a second input/output surface disposed at a second predetermined angle with respect to the second reflection surface for projecting the positioning light at light angles onto a position detection track of the recording medium.

The optical portion assembly includes a focus position adjusting portion for positioning the hologram portion such that the positioning light focuses on the position detection track of the recording medium.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Figure 1:
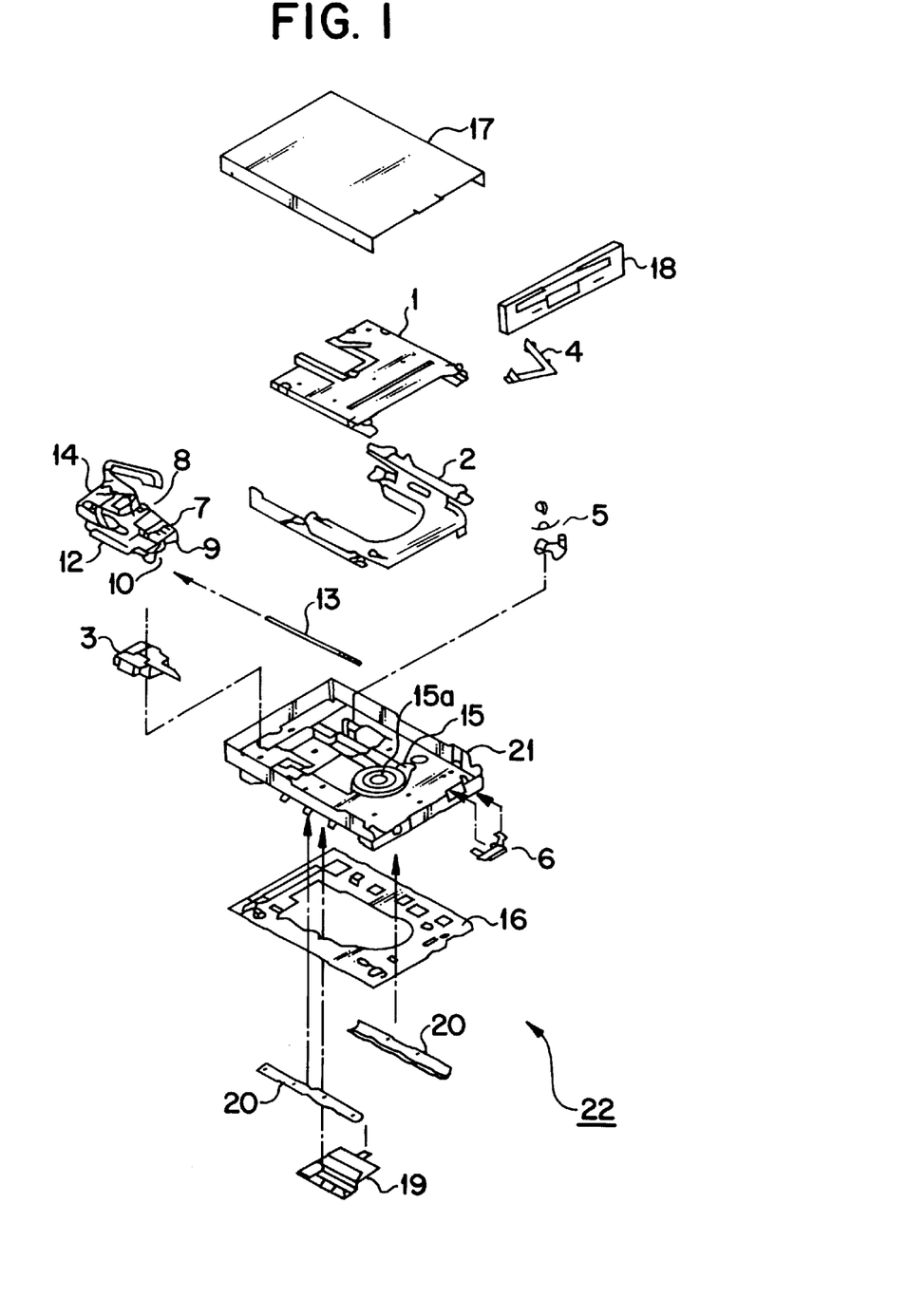
FIG. 1 is an exploded perspective view of the magnetic recording apparatus of one embodiment of the present invention.
Figure 2:
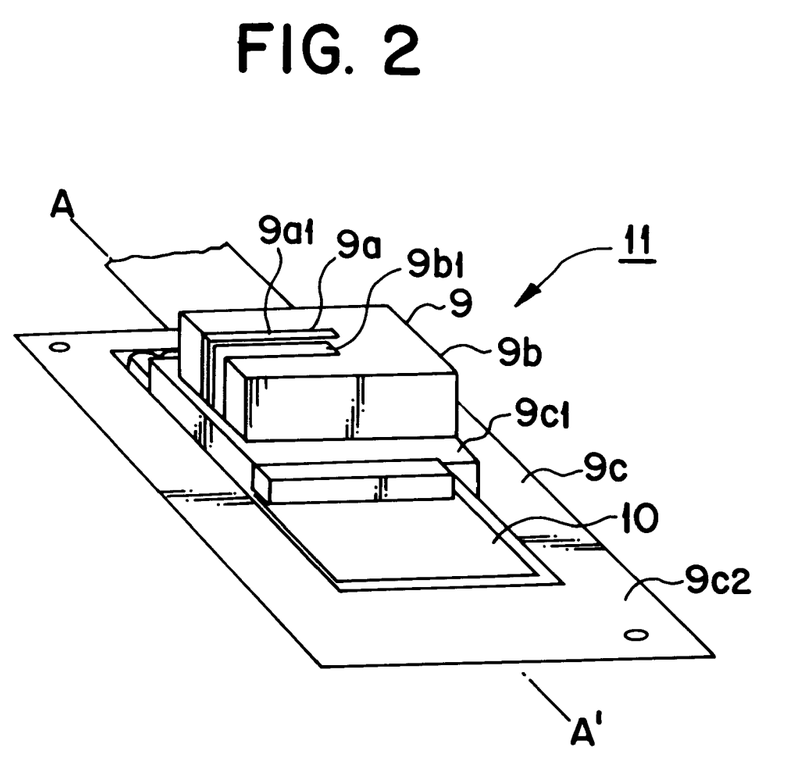
FIG. 2 is a perspective view showing the second magnetic head portion shown in FIG. 1.
Figure 3:
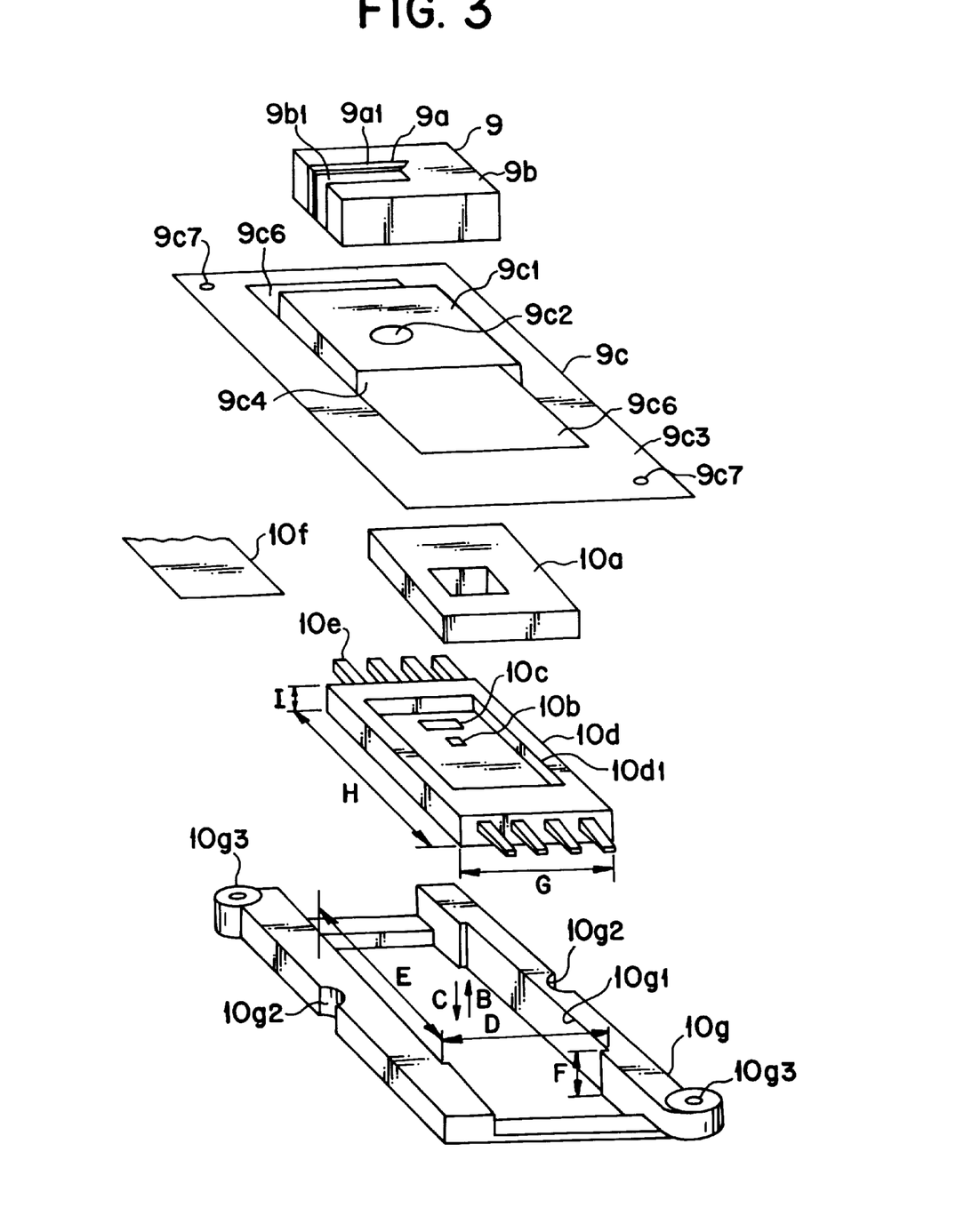
FIG. 3 is an exploded perspective view showing the second magnetic head portion shown in FIG. 1.
Figure 4:
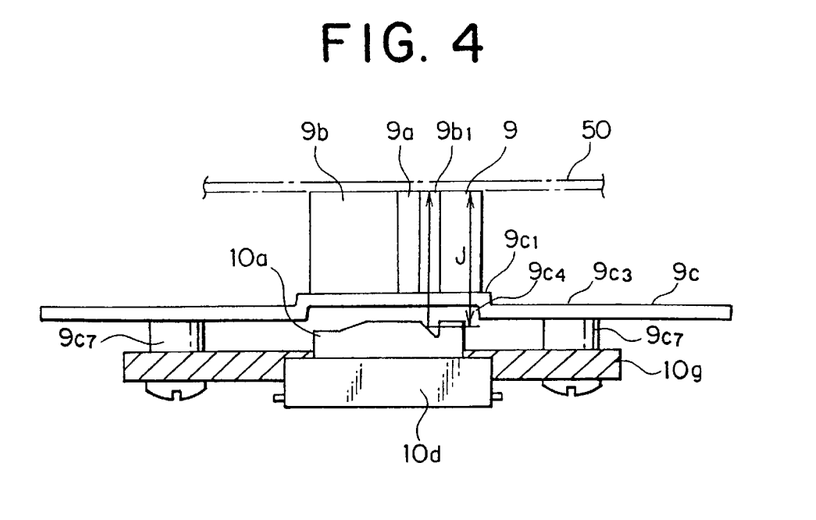
FIG. 4 is a sectional view taken along line A-A' of FIG. 2.

FIG. 1 is an exploded perspective view of a magnetic recording apparatus of an embodiment of the present invention, FIG. 2 is a perspective view of the second magnetic head portion shown in FIG. 1, FIG. 3 is an exploded perspective view of the second magnetic head portion shown in FIG. 2 and FIG. 4 is a sectional view taken along line A-A' shown in FIG. 2.

In FIG. 1, 1 is a holder for detachably holding a recording medium 50 (see FIG. 9), 2 is a side cam movable in the direction of loading and unloading of the recording medium 50 for moving the holder 1 in the direction perpendicular to the loading and unloading direction toward or away from the frame 21. 3 is a loading motor for moving the slide cam 2, 4 is a shutter opener rotatably supported from the top plate of the holder 1, for opening and closing the shutter disposed to the cartridge portion 50b upon the loading and unloading of the recording medium 50. 5 is a latch portion for holding the slide cam 2 at the loaded position of the recording medium 50, and 6 is a button portion for directing the release of the recording medium 50. The above components 1 to 6 inclusive constitute a loading mechanism portion for loading and unloading the recording medium 50.

Also, 7 is a first magnetic head portion which slides on one surface of the recording medium 50 to magnetize that surface for recording or erasing the information thereon or reproducing the information recorded thereon. 8 is an arm having one end at which the first magnetic head portion 7 is supported and the other end rockably supported by a carriage 12. Also, the arm 8 is biased by a spring or the like toward the recording medium 50 so that the first magnetic head portion 7 is allowed to slidably move on the recording medium 50.

In FIGS. 1 and 2, 9 is a second magnetic head portion which slidably moves on the other surface of the recording medium 50 (i.e., the surface on which the position detection track grooves 50a shown in FIG. 9 are provided) to magnetize that recording surface for recording or erasing the information thereon or reproducing the information recorded thereon. 10 is an optical portion that comprises a hologram portion including a lens, an optical refraction element and the like, a light emitting portion, a light receiving portion and the like. The above components 9 and 10 constitute an optical magnetic head portion 11.

In FIG. 1, 12 is a carriage, which supports the arm 8, the second magnetic head 9 and the optical portion 10. 13 is a guide shaft for guiding the carriage 12 in the direction of diameter of the recording medium 50. 13 is a carriage drive motor for moving the carriage 12 in the direction of the diameter of the recording medium 50. The above components 7 to 14 inclusive constitute a carriage mechanism portion.

Also, 15 is a recording medium drive motor which rotates with the recording medium 50 supported by means of a hub 15a. 16 is a control portion for achieving the transmission and reception of the signals in relation to the external system side (not shown), the closed loop optical servo control of the carriage mechanism portion, the rotation control of the recording medium drive motor 15 and the like. Also, 17 is a top cover, 18 is a front cover, 19 is a bottom cover, 20 is a mounting member for mounting to an external device (not shown), 21 is an die-case aluminum frame for mounting or accommodating the above components 1 to 20 inclusive. 22 is a magnetic recording apparatus, which comprises the above components 1 to 21 inclusive.

In FIGS. 2 and 3, 9a is a magnetic core portion having a magnetic gap portion 9a1 and a coil (not shown) wound thereon. 9b is a slider portion holding a magnetic core portion 9a. 9b1 is a light passage portion which is a notched portion formed in the slider portion 9b for allowing the positioning light from the light portion 10.

Reference character 9c is a support portion to which the slider portion 9b is secured and is made of a stainless steel sheet material. It is to be noted that the support portion 9c may be made of any other suitable material having a sufficient strength such as a suitable resin material.

Also, 9c1 is a first mount portion disposed to the support portion 9c and having the slider portion 9b secured to its surface opposite to the recording medium 50. 9c2 is a light passage portion for allowing the passage of the positioning light, which is defined by a through hole of a predetermined dimension formed in the first mounting portion 9c1. 9c3 is a second mounting portion disposed to the support portion 9c for supporting the optical portion 10.

Also, 9c4 is a receptacle portion defined by the step between the first mounting portion 9c1 and the second mounting portion 9c3. 9c5 and 9c6 are notch portions formed in to the support portion 9c while 9c7 is a female thread portion formed in the mounting portion 9c3. It is to be noted that the second magnetic head portion 9 comprises the components 9a–9c7.

Also, 10a is a hologram portion including a plurality of optical means such as a lens, an optical refraction element and the like and is made of a transparent polyolefin group plastic material in the form of a plate having a thickness of 1.2 mm, a width of 2 mm and a length of 3 mm. 10b is a light emitting portion for emitting light and is a laser diode emitting light of a wavelength of about 8000 Å. 10c is a light receiving portion which is a photo diode for receiving light. The light receiving portion 10c is provided with a light receiving element and is capable of receiving a plurality of light beams. 10d is a light emitting and receiving portion which has the light emitting portion 10b and the light receiving portion 10c at predetermined positions, and 10d1 is a mounting portion disposed to the light emitting portion 10d to which the hologram portion 10a is secured by means of a bonding agent or the like.

Further, 10e is a terminal portion for transmitting and receiving the signals with respect to outside and is electrically connected to the light emitting portion 10b and the light receiving portion 10c. 10f is a flexible cable connected to the terminal portion 10e for relaying the signal between the control portion 16 and the optical portion 10. 10g is a holder portion for holding the light emitting and receiving portion poritoin 109d.

Also, 10g1 is a focus position adjusting portion provided in the holder portion 10g, which is formed into a longitudinal groove shape so as to make the light transmitting and receiving portion portion 10d movable in the direction of B or C which is the direction perpendicular to the plate in which the position detection track grooves 50a of the recording medium (shown in FIG. 9) are disposed, thereby making the mounting position adjustable, whereby the focus position of the hologram portion 10a of the optical portion 10 is made adjustable.

It is also to be noted that the focus position adjusting portion 10g1 is also an inclination limiting means for limiting the inclination relative to the recording medium 50 of the light axis of the light beam radiated to the recording medium 50 from the optical portion 10. That is, the focus position adjusting portion 10g1 has its dimensions D, E and F which are respectively D=G±0.05 mm and E=H±0.05 mm in relation to the dimensions G, H and I of the light emitting and receiving portion 10d, so that the limitation of the inclination of the light emitting and receiving portion 10d can be achieved and the inclination of the light axis of the light beam radiated to the recording medium 50 can be restricted.

Examples of the dimensions are the dimension D=4 mm±0.05 mm, the dimension E=9 mm±0.05 mm and the dimension F=3 mm, thus the dimension G is 4 mm, H is 9 mm and I is 2 mm.

Also, 10g2 is the alignment adjusting positioning portion provided in the holder portion 10g, which is provided by forming an arcuated recess in the side portion of the holder portion 10g. The alignment adjusting positioning portion 10g2 is formed in to the holder portion 10g so that the light emitting portion 10b is located on the line connecting them. The alignment adjusting positioning portion 10g2 allows the mounting angle of the optical portion 10 on a plane intersecting perpendicularly in the B direction or the C direction for the position adjustment of three lights aligned along a straight line and irradiated to the recording medium 50 from the optical portion 10. 10g3 is a mounting portion in which a through hole through which a threaded portion of a thread (not shown) engaging with the female thread portion 9c7 can pass with a predetermined amount of play. It is to be noted that the optical portion 10 includes the structures indicated by the reference numerals 10a–10g3.

In FIG. 4, J is a distance from the second input output surface 10a5 (shown in FIG. 5) of the hologram portion 10a to the recording medium 50 and is set within a range of 2.0 mm to 2.5 mm.

Figure 5:
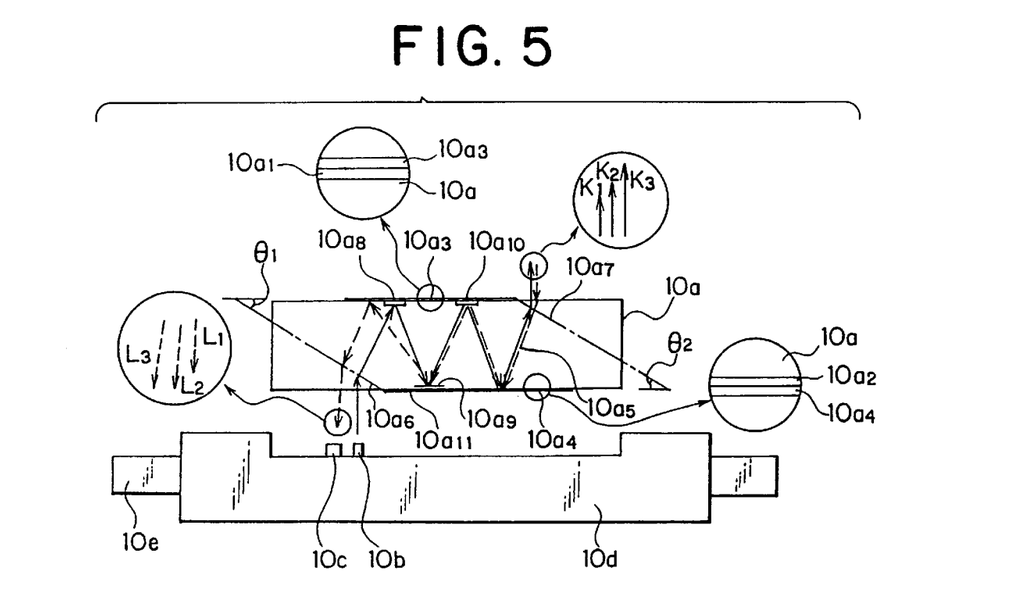
FIG. 5 is a view for explaining details of the hologram portion shown in FIG. 3.

FIG. 5 is a detailed explanatory view of the hologram portion 10a. In the figure, the same reference characters as in FIGS. 2–4 are the same or corresponding components and their description will therefore be omitted. In the figure, 10a1, 10a2 are first and second thin film layers evaporation-deposited on one surface and the other surface parallel to the one surface of the hologram portion 10a made of a polyolefin system plastic material, formed of a predetermined metal or predetermined metal composition.

The reference numerals 10a3 and 10a4 are a first and a second reflection surface each formed of gold (Au) evaporation-deposited the a thickness of about 2000 Å on the first and the second thin film layers 10a1 and 10a2. By using gold in the reflection surface the reflection rate is improved as compared to the conventional case where aluminum is used, so that a light output sufficiently strong for positioning the first and the second magnetic head portion can be obtained.

The reason that the hologram portion 10a is not directly subjected to the evaporation deposition of gold is that, differing from aluminum, gold does not adhere very well with polyolefin plastic and easily separates when it is directly evaporation deposited on the hologram portion 10a, so that a first and a second thin film layer 10a1 and 10a2 are respectively interposed when the first and the second reflection surfaces 10a3 and 10a4 are formed.

Figure 6:
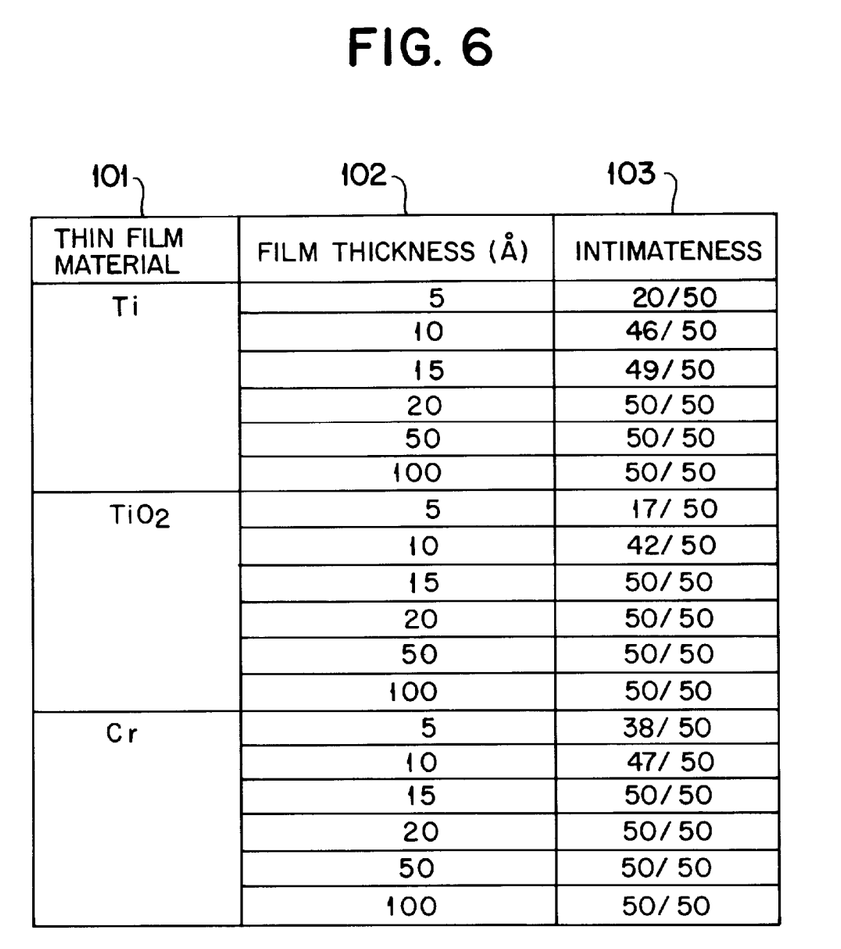
FIG. 6 is a diagram showing the relationship between the thin film layer and the reflection factor.
Figure 7:
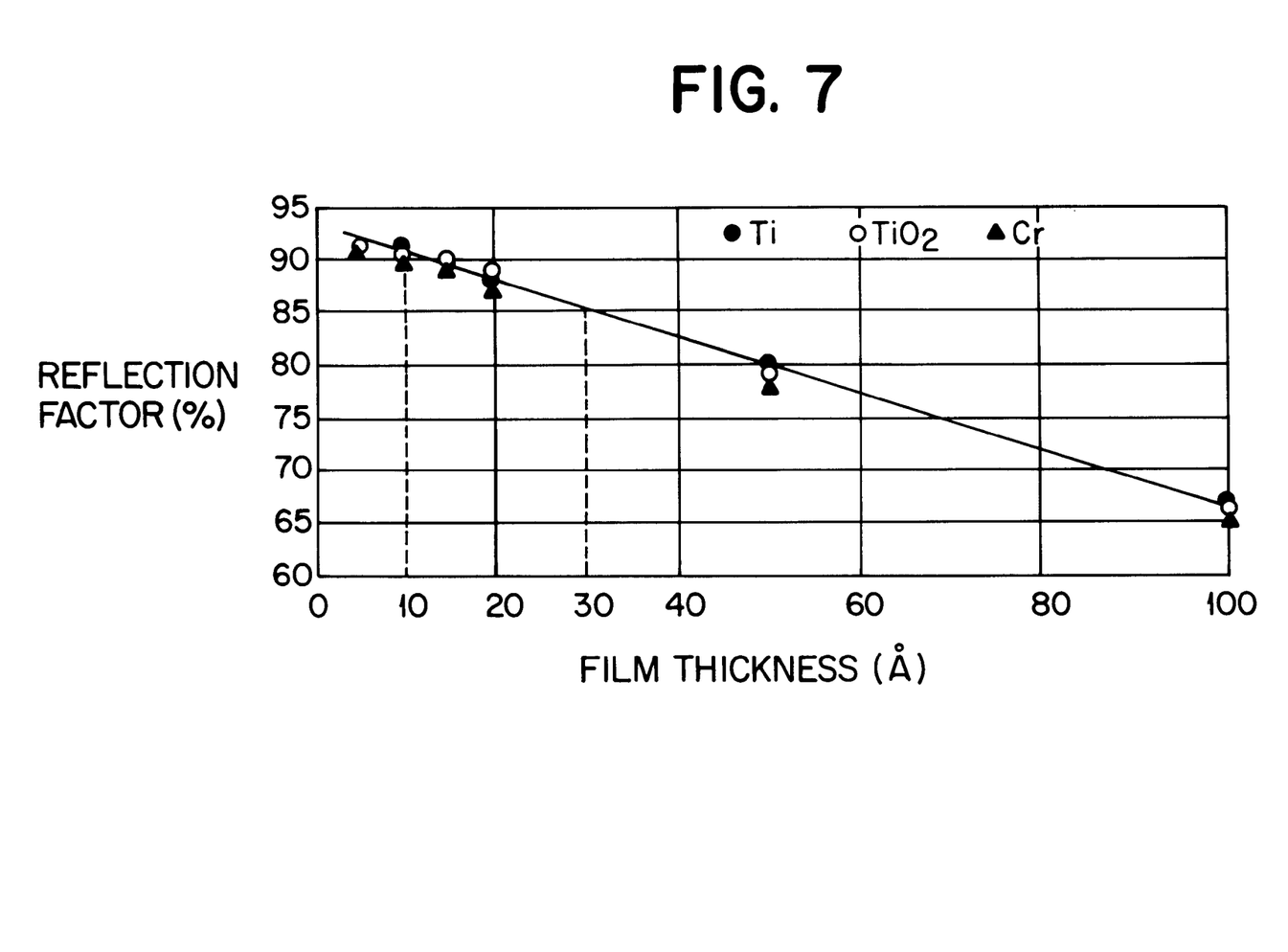
FIG. 7 is a graph illustrating the inimateness of the reflection surfaces.

The relationship between the first and the second thin film layers 10a1 and 10a2 and the first and the second reflection surfaces 10a3 and 10a4 will now be described. FIG. 6 is a table showing the relationship between the thickness of the first and the second thin film layers and the intimateness of the first and the second reflection surfaces. FIG. 7 is a graph depicting the reflection factor of the first and the second reflection surfaces versus film thickness. In FIG. 7, the axis of ordinates represents the reflection factor of the hologram portion 10a, the axis of abscissas represents the film thickness of the first and the second thin film layers 10a1 and 10a2, and the symbols ○, ●, ▲ represent titanium dioxide, titanium, and chromium, respectively. FIG. 7 is a graphical representation of the reflection factor of the hologram portion 10a having the first and the second reflection surfaces 10a3 and 10a4 formed with gold.

As shown in FIG. 7, when the film thickness of the first and the second thin film layers 10a1 and 10a2 are 30 Å, the reflection factor is about 85%, when the film thickness is 20 Å the reflection factor is about 86 to 89%, when the film thickness is 10 Å the reflection factor is 90 to 91% and when the film thickness is 5 Å the reflection factor is about 93%. Therefore, the thinner the film thickness the higher the reflection factor and the characteristics of gold defining the first and the second reflection surfaces 10a3 and 100a4 can be better effectively utilized and the output light loss passing through the light path 10a5 (see FIG. 5) can be suppressed.

However, if the film thickness exceeds 30 Å, the reflection factor decreases to be less than 85% and, similarly to the conventional first and the second refection surfaces 10a3 and 10a4 made of aluminum which exhibits a reflection factor of about 80% as in the conventional design (in this case the first and the second thin film layers 10a1 and 10a2 are not necessary), it is not possible to obtain a sufficient light output propagating through the light path 10a5, making it difficult to position the first and the second magnetic head portions 7 and 9 to the predetermined recording tracks.

In FIG. 6, column 101 is a material column for indicating the materials that can be used as the first and the second thin film layers 10a1 and 10a2. 102 is a film thickness column indicating the film thickness of the first and the second thin film layers 10a1 and 10a3. 103 is an intimateness column, which indicates the intimateness of the polyolefin plastic materials with respect to gold with the material listed in the material column interposed therebetween. In FIG. 6, the material includes titanium, chromium and titanium dioxide for example, and the film thickness is divided into six classes so that the intimateness of gold with the respective film thickness is shown by whether or not the gold layer separates.

For example, the first and the second thin film layers 10a1 and 10a2 are made of titanium and the thickness is of 5 Å, the intimateness of gold defining the first and the second reflection surfaces 10a3 and 10a4 is 20/50, which means that 20 samples out of 50 samples were not separated whereas 30 samples were separated, or the intimateness was in the order of 40%. In this case, it can be also said that the manufacturing yields is about 40%.

Accordingly, when the film of titanium, titanium dioxide and chromium all have a film thickness of 10 Å, their intimateness is 84% to 94% and the manufacturing yield is also 84% to 94%. Also, when the film of titanium, titanium dioxide and chromium all have a film thickness of 20 Å, their intimateness is 100% and the manufacturing yield is also about 100%.

Therefore, when titanium or chromium is selected as the predetermined metal for forming the first and the second film layers 10a1 and 10a2 and their film thickness is made 10 Å to 30 Å, a good reflection factor can be obtained and the reliability of the magnetic recording apparatus can be improved. Also, since the manufacturing yields of the hologram portion 10a is improved, the cost can be lowered. It is to be noted that titanium is used as the first and the second thin film layers 10a1 and 10a2 in this embodiment.

In FIG. 5, 10a5 is a light path defined by the first reflection surface 10a3 and the second reflection surface 10a4 for propagating the light in a zig-zag manner within the hologram portion 10a. Also, 10a6 is a first input-output surface, which is disposed at a predetermined angle θ1 with respect to the first reflection surface 10a3 (θ1 may be 34 degrees, for example) and connected to the second reflection surface 10a4. 10a7 is a second input-output surface, which is disposed at a predetermined angle θ2 with respect to the second reflection surface 10a4 (θ2 may be 34 degrees, for example) and connected to the first reflection surface 10a3.

Also, 10a8 is a first optical diffraction grid of the reflection type, also referred to as a diffraction grating disposed in the light path 10a5 for dividing the light from the light emitting portion 10b into a plurality of light beams. The diffraction grid 10a8 may be of a rectangular shape having a pitch of 13.1 μm and a depth of 0.05 μm. 10a9 is a beam splitter which is a second optical diffraction grid for inputting a 0-power reflected light out of the plurality of light beams from the first optical diffraction grid 10a8 to a reflection type Fresnel lens 10a10 and outputting a first-power diffraction light out of the plurality of light beams from the recording medium 50 (shown in FIG. 9).

Also, 10a11 is an anti-reflection film for preventing the reflection of the light of a wavelength emitted from the light emitting portion 10b, which is formed by applying a matt black paint coating on the region other than the first input/output surface 10a6 of the surface opposing to the light emitting portion 10b of the hologram portion 10a. With respect to the light emitted from the light emitting portion 10b which has a wavelength of 8000 Å, the black paint coating is effective for almost completely preventing the reflection and the matt paint further improve the anti-reflection effect.

The positioning light emitted to the recording medium 50 from the hologram portion 10a is in the form of three beams aligned on a straight line as illustrated by positioning light K1, K2, K3 shown in the enlarged view. These positioning light beams K1, K2, K3 are perpendicularly radiated relative to the plane in which the positioning track grooves 50a are formed. Also, the reflected light from the recording medium 50 incoming to the light-receiving portion 10c from the hologram portion 10a is in the form of three reflected light beams K1, K2, K3 shown in the enlarged view.

Figure 8:
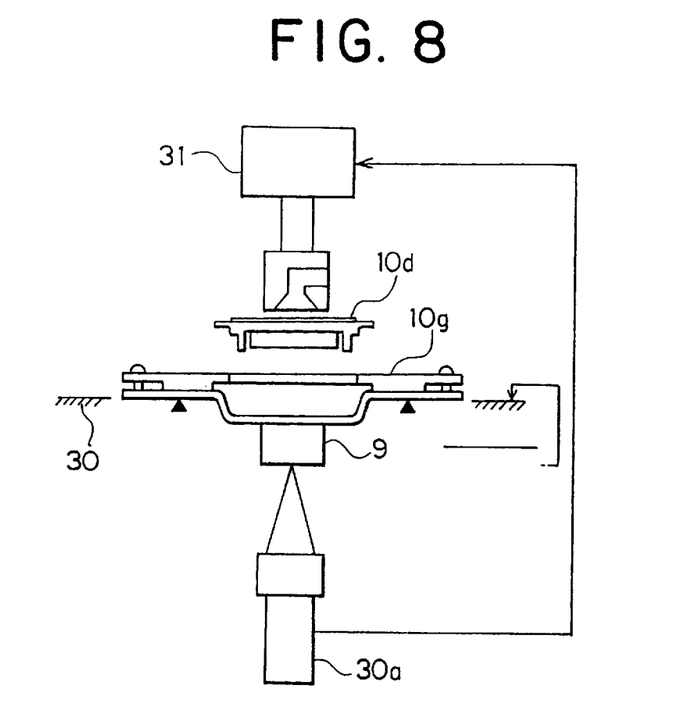
FIG. 8 is a view illustrating the adjustment of the optical system.

Its operation will now be described. First, the focus adjustment of the optical portion 10 will be described. FIG. 8 is a view for explaining the adjustment of the optical system.

The second magnetic head portion 9 is mounted on a focus adjustment jig 30 with the sliding surface downwardly directed and the holder portion 10g placed thereon and the screw extending through the mounting portion 10g3 is thread engaged into the female portion 9c7 to preliminary fix the holder portion 10g to the second mounting portion 9c3 as shown in FIG. 4.

Then, the light emitting and receiving portion 10d held by a suction type air chuck is inserted into the focal position adjusting portion 10g1 (shown in FIG. 3) by the handling portion 31.

Then, the light emitting portion 10b emits light. The light from the light emitting portion 10b is passed through the light transmitting portion 9b1 of the second magnetic head portion 9 as three positioning light beams, K1, K2, K3 by the hologram portion 10a and the focal distance and the spot diameter are measured by the beam analyzer 30a of the focus adjusting jig 30. The measured results are supplied to the handling portion 31, which causes the light emitting and receiving portion 10d to move upward or downward (that is, in the direction B or C shown in FIG. 3) according to the measured result until a predetermined focal distance at which the beam spot diameter is the smallest to determine the position of the light emitting and receiving portion 10d. Thereafter, the light emitting and receiving portion 10d is secured to the focus position adjusting portion 10g1 by a bonding agent or the like.

It is to be noted that, since the focus position adjusting portion 10g1 serves also as an inclination limiting means for limiting the inclination of the light beam axis, the axis is limited to fall within a range of 90 degrees±1 degree with respect to the plane in which the position detection track grooves 50a of the recording medium 50 are formed. Also, the amount of inclination may be controlled by detecting the inclination of the light emitting and receiving portion 10d by measuring the spot position by the beam analyzer 30a upon the up and down movement of the handling portion 31.

Next, a description will be made as to the alignment adjustment of the optical portion 10. After focus has been adjusted and the light emitting and receiving portion 10d has been secured, pins (not shown) each having a diameter substantially corresponding to the arcuate recesses of the alignment adjusting positioning portion 10g2 (shown in FIG. 3) are brought into engagement with the alignment adjusting positioning portion 10g2 so that the two alignment adjusting positioning portion 10g2 allows the angular adjustment of the light emitting and receiving portion 10d together with the entire holder portion 10g. Then, when the light emitting portion 10b emits light, the light is supplied through the hologram portion 10a as three positioning light beams K1, K2, K3 (shown in FIG. 5).

Then, the position and the relating position of the positioning light beams K1, K2, K3 are measured by the beam analyzer 30a, and the measured results are supplied to the handling portion 31. The handling portion 31 achieves a fine adjustment of the angle of the light emitting and receiving portion 10d so that the measured results of the beam analyzer 30a indicates the predetermined mounting position on the basis of the supplied measured results.

Then, after the measured results of the beam analyzer 30a indicates the predetermined mounting position, the screw threaded into the female portion 9c7 is further tightened to finally secure the holder portion 10a to the second magnetic head portion 9.

Following this, the assembly is mounted on an athymath adjustment jig (not shown) of the second magnetic head 9 to achieve the athymath adjustment between the magnetic gap portion 9a1 and the recording track (not shown) and the second mounting portion 9c3 (shown in FIG. 2) is secured to the carriage 12 (shown in FIG. 1) by a bonding agent or the like.

The operation of the optical magnetic head portion 11 will now be described in conjunction with the drawings. When a light beam is emitted from the light emitting portion 10b shown in FIG. 5, the light refracts at a first refraction angle (12.5 degrees in this embodiment) at the first input and output surface 10a6 of the hologram portion 10a into the light path 10a5 and is directed to the first optical diffraction grid 10a8 disposed on the first reflection surface 10a3.

The light radiated to the area other than the first input and output surface 10a6 out of the emitted light from the light emitting portion 10b does not affect the light receiving portion 10c because it is prevented from being reflected by the anti-reflection film 10a11.

Then, the light introduced into the first optical diffraction grid 10a8 is divided into three positioning light beams K1, K2, K3 aligned on a straight line. The positioning light beams K1, K2, K3 pass through the first thin film layer 10a1 and reflect at the first reflection surface 10a3 toward the beam splitter 10a9 disposed on the second reflection surface 10a4.

Then, the positioning light beams K1, K2, K3 are introduced into the Fresnel lens 10a10 disposed on the first reflection surface 10a3.

The film thickness of the first and the second thin film layers 10a1 and 10a2 are 10 Å to 30 Å, the output loss due to the light being passed through the first and the second thin film layers 10a1 and 10a2 are made relatively small and the positioning light beams K1, K2, K3 of a sufficient power are transmitted through the light path 10a5 without deteriorating the reflection property of the gold layer defining the first and the second reflection surfaces 10a3 and 10a4.

Next, the positioning light beams K1, K2, K3 of the 0 power diffraction light extruded by the beam splitter 10a9 are focused by the Fresnel lens 10a10, passed through the first thin film layer 10a1, reflected by the first reflection surface 10a3 to the second reflection surface 10a7, refracted at the second input and output surface 10a7 at the second refraction angle (arranged to have a refraction angle of 12.5 degrees in this embodiment) and emitted perpendicularly to the plane of the recording medium 50 in which the position detection track grooves 50a are formed.

It is to be noted that the positioning light beams K1, K2, K3 are emitted perpendicularly from the second input and output surface 10a7 disposed at the second predetermined angle θ2, so that they can pass through the light passing portion 9b1.

Then, the positioning light beams K1, K2, K3 passes through the light passing portion 9b1 disposed to the second magnetic head 9 to irradiate the position detection track grooves 50a of the recording medium 50 as shown in FIG. 9 where they pass through the light passing portion 9b1 and return to the hologram portion 10a as the reflected light beams L1, L2, L3 having different intensity according to the irradiation of the position detection track grooves 50a.

Following this, the reflected light beams L1, L2, L3 (FIG. 5) are refracted at the second input and output surface 10a7 at the second refraction angle to be supplied to the light path 10a4 and is transmitted through the second thin film layer 10a2 so as to be reflected at the reflection surface 10a4 toward the Fresnel lens 10a10.

It is to be noted that the reflected light beams L1, L2, L3 are allowed to be transmitted through the light path 10a5 with sufficient power in a similar manner to the positioning light beams K1, K2, K3.

Then, the reflected light beams L1, L2, L3 are subjected to the extraction of their first power diffracted light at the beam splitter 10a9, passed through the thin film layer 10a2 and are reflected by the second reflection surface 10a4 toward the first reflection surface 10a3.

The reflection light beams L1, L2, L3 are then passed through the thin film layer 10a1, reflected at the first reflection surface 10a3 toward the first input and output surface 10a6 and refracted at the first input and output surface 10a6 toward the light receiving portion 10c.

Next, the light receiving portion 10c which received the reflection light beams L1, L2, L3 supplies a detection signal according to the intensity of the received light to the control portion 16.

The control portion 16 then drives the carriage driving motor 14 in response to the detection signal to move the carriage 12 to position the first and the second magnetic head portions 7 and 9 to the predetermined positions.

While the film thickness of the first and the second thin film layers 10a1 and 10a2 are made 10 to 30 Å in this embodiment, the film thickness may be made 10 to 20 Å to improve the reflection factor while maintaining the good manufacturing yield, so that the output of the positioning light beams K1, K2, K3 and the reflection light beams L1, L2, L3 can be made large, making for easy closed loop optical servo control easy and improved reliability of the apparatus.

When the film thicknesses of the first and the second thin film layers 10a1 and 10a2 are made 10 Å, the reflection factor can be made a maximum while maintaining a good manufacturing yield and the output power of the positioning light beams K1, K2, K3 and the reflection light beams L1, L2, L3 can also be made a maximum, making for easy closed loop optical servo control and the reliability of further improved apparatus.

As has been described, according to the magnetic recording apparatus 22 shown in this embodiment, the hologram portion is provided at one of the surfaces thereof with the first thin film layer 10a1 made of titanium, chromium or carbon dioxide titanium and the first reflection surface 10a3 formed on the first thin film layer 10a1 and made of gold and provided on the other of the surfaces with the similar second thin film 10a2 and on the second reflection surface 10a4 formed on the second thin film 10a2, so that the first and the second reflection surfaces 10a3 and 10a4 can be formed on the hologram portion 10a made of the plastic material of a polyolefin group, the outputs of the positioning light beams K1, K2, K3 or the reflection light beams L1, L2, L3 traveling through the light path 10a5 can be sufficiently maintained and the first and the second magnetic head portions 7 and 9 can be precisely positioned relative to a predetermined recording tracks, thereby improving the reliability of the apparatus.

Also, since the first and the second thin film layers 10a1 and 10a2 are formed of titanium, chromium or titanium dioxide and their film thicknesses are made 10 to 30 Å, the sufficient output of the positioning light beams K1, K2, K3 or the reflection light beams L1, L2, L3 can be maintained without degrading the reflection factors of the first and the second reflection surfaces 10a3 and 10a4 while maintaining good manufacturing yields.

When the film thicknesses of the first and the second thing film layers 10a1 and 10a2 are made 10 to 20 Å the reflection factor will be improved while maintaining good manufacturing yield, the output of the positioning light beams K1, K2, K3 and the reflection light beams L1, L2, L3 can be made larger, also improving the reliability of the apparatus.

When the film thicknesses of the first and the second thin film layers 10a1 and 10a2 are made about 10 Å, the reflection factor can be maximized while maintaining a good manufacturing yield and the output power of the positioning light beams K1, K2, K3, the reflection light beams L1, L2, L3 can be maximized, making easy closed loop optical servo control and a further improvement in the reliability of the apparatus.

Also, it is to be noted that the hologram portion 10a has the light path 10a4 defined by the first reflection surface 10a3 and the second reflection surface 10a4 which ensures the sufficient length of the light path by transmitting the light in a zig-zag manner and that the optical system can be made compact by locating the optical means such as the first optical diffraction grid 10a8, the beam splitter 10a9 and the Fresnel lens 10a10 within the light path. Also, the second input and output surface 10a7 which is located at the second predetermined angle with respect to the second reflection surface 10a4 can radiate the positioning light beams K1, K2, K3, through the light passing portion 9b1, to perpendicularly irradiate the plane of the recording medium 50 in which the position detection tracks 50a are disposed even when the recording medium 50 waggles or shakes, thereby to eliminating the need for a mirror or a lens between the second input and output surface 10a7 and the recording medium 50, while enabling the apparatus to be made thin.

Also, the holder portion 10g of the optical portion 10 comprises the focus position adjusting portion 10g1 which can easily move the light emitting and receiving unit portion 10d to which the hologram portion 10a is secured in the direction perpendicular to the plane in which the position detection track grooves 50a are formed, so that an easy adjustment of the focus position can be made.

Also, the focus position adjustment portion 10g1 also serves as an inclination limiting means for limiting the light beam axis of the positioning light beams K1, K2, K3 emitted from the optical portion 10 perpendicularly to the recording medium 50 within ±1 degree, so that the focus adjustment is made easier, thereby allowing the output of the positioning light beams K1, K2, K3 to be effectively utilized.

Also, the holder portion 10g of the optical portion 10 comprises the alignment adjusting positioning portion for adjusting the spot position of the positioning light beams K1, K2, K3, so that an alignment adjustment can easily be made.

Also, the optical portion 10 is mounted on the support portion 9c of the second magnetic head portion 9 so that the second magnetic head portion 9 and the optical portion 10 form a unitary structure on the optical magnetic unit portion 11 so that the focus position and the alignment position are not displaced, thus making for easy carrying and the shipping.

Also, the opposing surfaces of the light emitting portion 10b of the hologram portion 10a are provided with the anti-reflection film 10a11 other than the first input and output surface 10a6, so that the light that does not enter into the light path 10a4 out of the light emitted from the light emitting portion 10b is prevented from being reflected, and the light receiving portion 10c positioned in the vicinity of the light emitting portion 10b is therefor not disadvantageously affected.

As has been described, according to the present invention, the magnetic recording apparatus comprises a magnetic head portion for recording information on a disc-shaped recording medium and reproducing recorded information from the recording medium, a light emitting portion for emitting light, a hologram portion for converting the light from the light emitting portion into positioning light for positioning the magnetic head and for radiating it onto the recording medium and for receiving the reflected light therefrom, a light receiving portion for receiving the reflected light through the hologram portion and outputting a received light intensity signal, a carriage having the magnetic head portion at one end and arranged to be freely movable in a radial direction, and a control portion for driving the carriage on the basis of the receiving light-intensity signal from the light receiving portion to position the magnetic head portion at a predetermined position, the hologram portion being in a shape of a plate, the hologram portion having provided on its first major surface with a first thin film layer made of a predetermined metal or a composition thereof and a first reflection surface made of a metal of the element symbol of Au formed on the first thin film layer, the hologram portion having provided on its second major surface with a second thin film layer made of a predetermined metal or a composition thereof and a second reflection surface made of a metal of the element symbol of Au formed on the first thin film layer, and the hologram portion comprising a light path for transmitting light therethrough in a zigzag manner between the first and second reflection surfaces and a plurality of optical means disposed within the light path for converting the light from the light emitting portion into the positioning light, so that the first and the second reflection surface made of a metal can be formed on the hologram portion made of a plastic material of the polyolefin group, whereby the sufficiently strong output of the positioning light beam can be obtained, which enables the precise positioning of the magnetic head portion to the predetermined recording track, improving the reliability of the magnetic recording apparatus.

Also, according to the present invention, the predetermined metal is titanium and the first and second thin film layers have film thickness of 10–30 Å, so that the output of the positioning light can be maintained at a sufficient intensity without degrading the reflection factor of the first and the second reflection surfaces while maintaining good manufacturing yields.

Also, according to the present invention, the predetermined metal is titanium and the first and second thin film layers have film thickness of 10–20 Å, so that the output of the positioning light can be maintained at a sufficient intensity while maintaining good manufacturing yields.

Also, according to the present invention, the predetermined metal is titanium and the first and second thin film layers have film thickness of about 10 Å, so that the output of the positioning light can be maintained at a sufficient intensity while maintaining good manufacturing yields.

Also, according to the present invention, the predetermined metal composition is titanium oxide and the first and second thin film layers have film thickness of 10–30 Å, so that the output of the positioning light can be maintained at a sufficient intensity without degrading the reflection factor of the first and the second reflection surfaces while maintaining good manufacturing yields.

Also, according to the present invention, the predetermined metal composition is titanium oxide and the first and second thin film layers have film thickness of 10–20 Å, so that the output of the positioning light can be maintained at a sufficient intensity while maintaining good manufacturing yields.

Also, according to the present invention, the predetermined metal composition is titanium oxide and the first and second thin film layers have film thickness of about 10 Å, so that the output of the positioning light can be maintained at a sufficient intensity while maintaining good manufacturing yields.

Also, according to the present invention, the predetermined metal is chromium and the first and second thin film layers have film thickness of 10–30 Å, so that the output of the positioning light can be maintained at a sufficient intensity without degrading the reflection factor of the first and the second reflection surfaces while maintaining good manufacturing yields.

Also, according to the present invention, the predetermined metal is chromium and the first and second thin film layers have film thickness of 10–20 Å, so that the output of the positioning light can be maintained at a sufficient intensity while maintaining good manufacturing yields.

Also, according to the present invention, the predetermined metal is chromium and the first and second thin film layers have film thickness of about 10 Å, so that the output of the positioning light can be maintained at a sufficient intensity while maintaining good manufacturing yields.

Also, according to the present invention, the hologram portion comprises a first optical refraction means for dividing, a second optical refraction means for deflecting the travel path of the light passing through the light path, and an optical focusing means for focusing the light passing through the light path, so that the light beam from the light emitting portion can be easily converted into the positioning light beam.

Also, according to the present invention, the light emitting portion, the hologram portion and the light receiving portion are secured together to define an optical portion assembly supported from the magnetic head portion, the optical portion assembly allowing the positioning light from the hologram portion to be irradiated onto the recording medium through a light passing portion of the magnetic head portion, so that the deviation of the relative position between the optical unit portion and the magnetic head portion can be prevented, thereby preventing a misalignment of the focal position or the like.

Also, according to the present invention, the hologram portion comprises a first input/output surface disposed at a first predetermined angle with respect to the first reflection surface for introducing the light from the light emitting portion into the first optical refraction means and a second input/output surface disposed at a second predetermined angle with respect to the second reflection surface for projecting the positioning light at light angles onto a position detection track of the recording medium, so that there is no need to provide a lens, a mirror or the like between the second input and output surface and the recording medium, thereby enabling a thin apparatus to be produced.

Also, according to the present invention, the optical portion assembly comprises a focus position adjusting portion for positioning the hologram portion such that the positioning light focuses on the position detection track of the recording medium, so that a focus adjustment of the light beam emitted from the hologram portion can easily be made.

What is claimed is:

1. A magnetic recording apparatus comprising:
    a magnetic head portion for recording information on a disc-shaped recording medium and reproducing recorded information from said recording medium;
    a light emitting portion for emitting light;
    a hologram portion for converting said light from said light emitting portion into positioning light for positioning said magnetic head portion and for radiating it onto said recording medium and for receiving the reflected light therefrom;
    a light receiving portion for receiving said reflected light through said hologram portion and outputting a received light intensity signal;
    a carriage having said magnetic head portion located thereon and arranged so as to be freely movable in a radial direction; and
    a control portion for driving said carriage in response to said received light intensity signal from said light receiving portion and being operable to position said magnetic head portion at a predetermined position;
    said hologram portion including a body member having first and second major surfaces;
    said body member of the hologram portion having a first thin film layer made of a predetermined metal or a composition thereof located on said first major surface and a first reflection surface made of metallic material located on said first thin film layer
    said hologram portion having a second thin film layer made of a predetermined metal or a composition thereof located on said second major surface and a second reflection surface made of metallic material located on said second thin film layer; and
    said body member of the hologram portion further including a light path for transmitting light therethrough in a zig-zag manner between said first and second reflection surfaces and a plurality of optical means located on said body member and in said light path for converting the light from said light emitting portion into said positioning light.

2. The magnetic recording apparatus as claimed in claim 1, wherein said predetermined metal is titanium and said first and second thin film layers have a film thickness of about 30 Å or less.

3. The magnetic recording apparatus as claimed in claim 2, wherein said first and second thin film layers have a film thickness having a range between about 10–20 Å.

4. The magnetic recording apparatus as claimed in claim 2 wherein said first and second thin film layers have a film thickness of about 10 Å.

5. The magnetic recording apparatus as claimed in claim 2, wherein said first and second thin film layers have a film thickness having a range between about 10–30 Å.

6. The magnetic recording apparatus as claimed in claim 1, wherein said predetermined metal composition is titanium oxide and said first and second thin film layers have a film thickness of about 30 Å or less.

7. The magnetic recording apparatus as claimed in claim 6, wherein said first and second thin film layers have a film thickness having a range between about 10–20 Å.

8. The magnetic recording apparatus as claimed in claim 6, wherein said first and second thin film layers have a film thickness of about 10 Å.

9. The magnetic recording apparatus as claimed in claim 6, wherein said first and second thin film layers have a film thickness having a range between about 10–30 Å.

10. The magnetic recording apparatus as claimed in claim 1, wherein said predetermined metal is chromium and said first and second thin film layers have a film thickness of about 30 Å or less.

11. The magnetic recording apparatus as claimed in claim 10, wherein said first and second thin film layers have film thickness having a range between about 10–20 Å.

12. The magnetic recording apparatus as claimed in claim 10, wherein said first and second thin film layers have a film thickness of about 10 Å.

13. The magnetic recording apparatus as claimed in claim 10, wherein said first and second thin film layers have a film thickness having a range between about 10–30 Å.

14. The magnetic recording apparatus as claimed in claim 1, wherein said hologram portion further includes first optical refraction means for dividing the light from said light emitting portion into a plurality of light beams, second optical refraction means for deflecting the travel path of the light passing through the light path, and optical focusing means for focusing the light passing through said light path.

15. The magnetic recording apparatus as claimed in claim 14, wherein said light emitting portion, said hologram portion and said light receiving portion are secured together to define a unitary optical portion assembly supported by said magnetic head portion, said optical portion assembly allowing said positioning light from said hologram portion to be irradiated onto said recording medium through a light passing portion of said magnetic head portion.

16. The magnetic recording apparatus as claimed in claim 15, wherein said hologram portion comprises a first input/output surface disposed at a first predetermined angle with respect to said first reflection surface for introducing the light from said light emitting portion into said first optical refraction means and a second input/output surface disposed at a second predetermined angle with respect to said second reflection surface for projecting the positioning light at light angles onto a position detection track of said recording medium.

17. The magnetic recording apparatus as claimed in claim 16, wherein said optical portion assembly includes a focus position adjusting portion for positioning said hologram portion such that the positioning light focuses on said position detection track of said recording medium.

18. The magnetic recording apparatus as claimed in claim 14 wherein said first optical refraction means comprises a diffraction grating for generating said plurality of light beams, said second refraction means comprises a beam splitter for inputting a power reflected light out of said plurality of light beams to said optical focusing means, and wherein said focusing means comprises a reflection type Fresnel lens for outputting first-power diffraction light out of said plurality of light beams from said recording medium.

19. The magnetic recording apparatus as claimed in claim 1 wherein said metallic material of said first and second reflection surfaces comprises gold.

20. The magnetic recording apparatus as claimed in claim 19 wherein said first and second reflection surfaces have a thickness of about 2000 Å.

21. The magnetic recording apparatus as claimed in claim 1 wherein said light emitting portion includes a laser diode.

22. The magnetic recording apparatus as claimed in claim 21 wherein said laser diode emits a light having a wavelength of about 8000 Å.

23. The magnetic recording apparatus as claimed in claim 21 wherein said light receiving portion includes a photo diode.

24. A magnetic recording apparatus comprising:

a magnetic head for recording information on a disc-shaped recording medium and reproducing recorded information from said recording medium;

a light emitting element for emitting light;

hologram means for converting said light from said light emitting element into light for positioning said magnetic head over the recording medium and for radiating it onto said recording medium and for receiving the light reflected therefrom;

a light receiving element for receiving said reflected light through said hologram means and outputting a received light signal;

said hologram means including a body member having first and second major surfaces and a first thin film layer made of a predetermined metal or a composition thereof located on said first major surface and a first reflection surface comprised of gold on said first thin film layer, a second thin film layer made of a predetermined metal or a composition thereof located on said second major surface and a second reflection surface also comprised of gold on said second thin film layers; and said body member further including a light path for transmitting light therethrough in a zig-zag manner between said first and second reflection surfaces and a plurality of optical means located on said body member and in said light path for converting the light from said light emitting portion into said positioning light.

* * * * *